Figure 1:
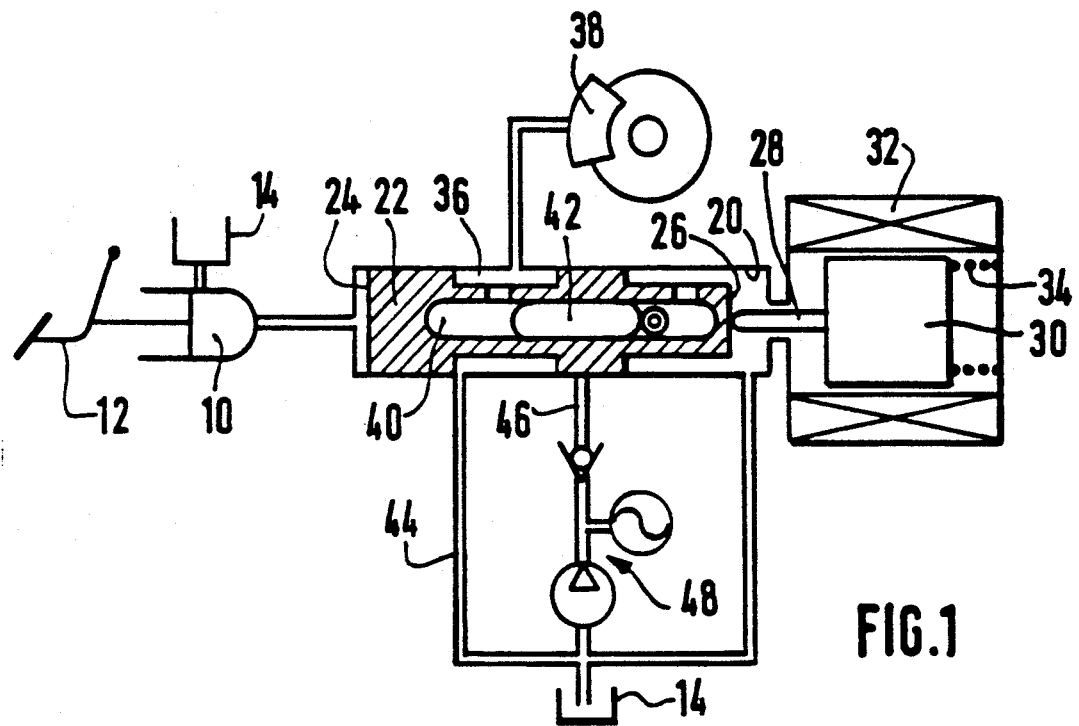

United States Patent [19]
Lebret

[11] Patent Number: 5,186,003
[45] Date of Patent: Feb. 16, 1993

[54] INTEGRATED PRESSURE AMPLIFICATION AND MODULATION SYSTEM FOR A HYDRAULIC CIRCUIT

[75] Inventor: Pierre Lebret, Le Chesnay, France

[73] Assignee: Bendix Europe Services Techniques, Drancy, France

[21] Appl. No.: 842,677

[22] Filed: Feb. 27, 1992

[30] Foreign Application Priority Data

Mar. 20, 1991 [FR] France ................... 91 03375

[51] Int. Cl.⁵ .................... F15B 13/042; F15B 13/044
[52] U.S. Cl. ........................ 60/555; 91/433; 137/625.65; 137/625.66; 303/119.2
[58] Field of Search ............... 60/555; 91/433; 137/625.65, 625.66; 303/117, 119 SV

[56] References Cited

FOREIGN PATENT DOCUMENTS

| 0182053 | 5/1986 | European Pat. Off. |
| 0369412 | 5/1990 | European Pat. Off. |
| 0452173 | 10/1991 | European Pat. Off. ...... 303/119 SV |
| 0452174 | 10/1991 | European Pat. Off. ...... 303/119 SV |
| 3408593 | 9/1985 | Fed. Rep. of Germany. |
| 2215416 | 9/1989 | United Kingdom. |
| 9005658 | 5/1990 | World Int. Prop. O. . |

Primary Examiner—Gerald A. Michalsky
Attorney, Agent, or Firm—Larry J. Palguta; K. C. Decker

[57] ABSTRACT

The invention relates to an integrated pressure amplification and modulation system for a hydraulic brake circuit, comprising at least one master cylinder (10), a hydraulic motor, a source of fluid under high pressure (48) and a reservoir of fluid under low pressure (14), a computer-controlled solenoid (32) modulating by way of a magnetic core (30) the position of a slide (22) which slides in a bore (20). According to the invention, the fluid under pressure coming from the master cylinder (10) is applied to one face (24) of the slide (22), the other face of which bears on the magnetic core (301) and receives the force exerted by a spring (34) for return to rest. A reaction chamber (40) formed in the slide (22) is connected permanently to the hydraulic motor (38), and the hydraulic motor (38) is connected either to the reservoir (14) or to the source of fluid under pressure (48), depending on the position of the slide (22).

3 Claims, 1 Drawing Sheet

INTEGRATED PRESSURE AMPLIFICATION AND MODULATION SYSTEM FOR A HYDRAULIC CIRCUIT

The invention relates to an integrated pressure amplification and modulation system for a hydraulic brake circuit of motor vehicles with anti-lock wheel braking. Current anti-lock systems make use, between a generator of fluid under pressure and a hydraulic motor, of a solenoid valve controlled by a computer as a function of signals representing the rotation of the wheels of the vehicle, in order, in general terms, to reduce the pressure of the fluid in the hydraulic motor when the computer detects the imminent locking of a wheel, and then to connect a second source of fluid under pressure so as to increase the pressure again, until imminent locking is detected once more, the cycle then being repeated.

The solenoid valve used is a solenoid valve functioning in the all-or-nothing mode. Now the anti-lock periods, when cycles such as the above-mentioned cycle take place, last some time, during which the solenoid valve changes state on very many occasions within a very short time. This causes an unpleasant hammering noise of the movable part of the solenoid valve.

Moreover, since the system functions in the all-or-nothing mode, pressure surges occur in the brakes, bringing about poorly controlled transient states.

Furthermore, the part functioning as a hydraulic amplifier and the part serving for anti-locking are two physically independent parts.

The present invention makes use of a so-called proportional solenoid valve ensuring, in the user circuit, a hydraulic pressure which is a function of the current circulating in the coil of the solenoid valve within a specific range of movement of the magnetic core of the solenoid valve.

Such a solenoid valve thus has the advantage that it can be controlled simply by varying the current circulating in the coil, without necessarily causing any hammering of the movable part; this therefore results in a sharp reduction of the pressure surges in the brakes. Moreover, such a solenoid valve can easily be controlled by a computer which ensures a cut-off of variable frequency of a direct current, such as is found on a motor vehicle, or a cut-off of fixed frequency and of variable cyclic ratio, the intensity of the current integrated by the coil then being a function of the cyclic ratio.

Such a solenoid valve is described, for example, in U.S. Pat. No. 4,744,389. However, the solenoid valve described in this document cannot be arranged in a hydraulic antilock wheel braking circuit because of the pressures employed, especially during the energization of the solenoid valve. In fact, the solenoid valve of this document is designed to function permanently in a system for regulating relatively low pressure. This physical limitation consequently prevents the use of such a solenoid valve with high pressures in the hydraulic motor.

The subject of the invention is, therefore, an integrated pressure amplification and modulation system for a hydraulic brake circuit, comprising at least one master cylinder, a hydraulic motor, a source of fluid under high pressure and a reservoir of fluid under low pressure, a computer-controlled solenoid modulating by means of a magnetic core the position of a slide which slides in a bore.

According to the invention, the fluid under pressure coming from the master cylinder is applied to one face of the slide, the other face of which bears on the magnetic core and receives the force exerted by a spring for return to rest; furthermore, a reaction chamber formed in the slide is connected permanently to the hydraulic motor, and the hydraulic motor is connected either to the reservoir or to the source of fluid under pressure, depending on the position of the slide.

Figure 2:
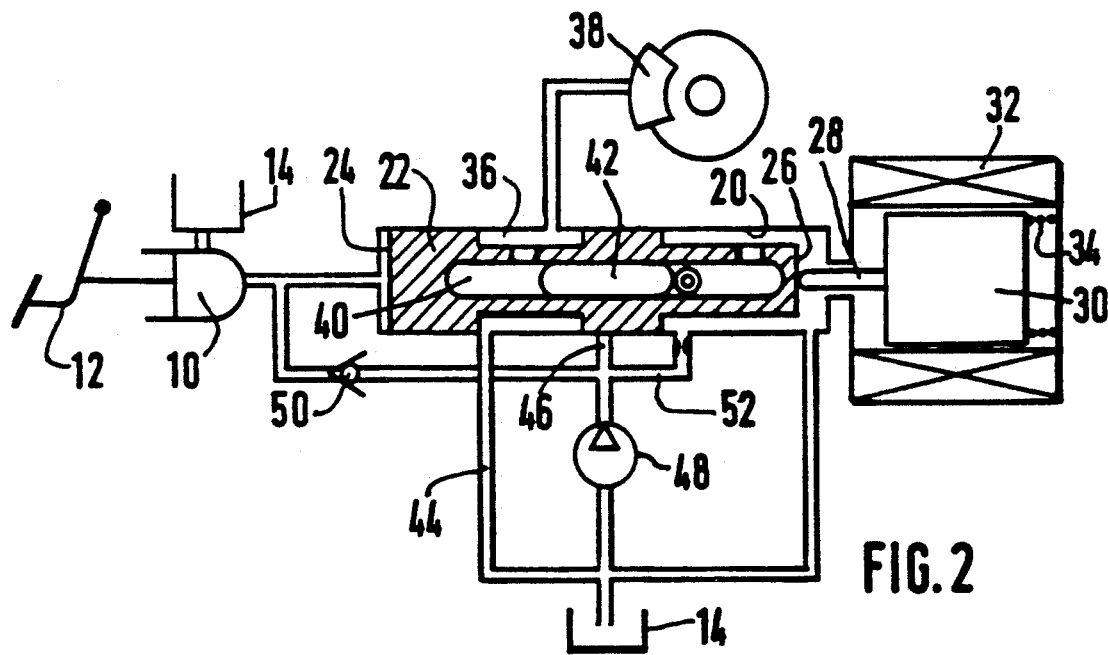

The invention will now be described by way of example with reference to the accompanying drawings in which:

FIGS. 1 and 2 show diagrammatically two embodiments of an integrated system according to the invention.

Referring now to FIG. 1, a pressure chamber with a master cylinder 10 controlled by a pedal 12 is fed with fluid under low pressure from a reservoir 14 (shown twice for convenience).

A slide 22 is capable of sliding sealingly in a bore 20 made in a body. The pressure of the fluid prevailing in the master cylinder 10 is applied to the face 24 of this slide 22. A magnetic core 30 driven by a solenoid 32 comes to bear on the opposite face 26 of this slide 22 either directly or indirectly by means of the rod 28. A return spring 34 returns the element to rest in the opposite direction to that determined by the pressure of the fluid coming from the master cylinder 10.

The slide 22 is equipped with a groove 36, to which at least one hydraulic motor 38, in this particular case a brake motor, is connected permanently. The groove 36 communicates with a reaction chamber 40 formed inside the slide 22. This reaction chamber 40 consists of a bore of the slide 22, in which a needle 42 fixed relative to the bore 20 is arranged sealingly, for the purpose of defining a chamber 40 of variable volume.

In a conventional way, the part of the bore 20 containing the rod 28 communicates with the reservoir of fluid under low pressure 14. Finally, two conduits communicate with the bore 20 in the region of the slide 22. One 44 connects the bore 20 to the reservoir 14 and is arranged so as to communicate with the groove 36 when the assembly is at rest; the other 46 is connected to a source of fluid under high pressure 48, for example comprising at least one pump.

Not shown in the Figures, a computer determines the current to be applied to the solenoid 32 as a function of information obtained by means of sensors located near the wheels.

The mode of operation is as follows. At rest, that is to say in the absence of any braking, the hydraulic motor 38 is connected to the reservoir 14 due to the fact that no pressure is exerted on the face 24 of the slide 22. As soon as the brake pedal is actuated, the pressure of the fluid coming from the master cylinder 10 is applied to the face 24 of the slide 22 counter to the return spring 34. The displacement of the slide closes the conduit 44 and opens communication between the conduit 46 and the brake motor 38. Pressure is therefore established in the reaction chamber 40, and the slide 22 assumes a new position of equilibrium which is a function of the forces exerted. There is therefore indeed a hydraulic amplification of the force exerted on the pedal 12.

In the event that the imminent locking of the corresponding wheel is detected, the computer applies a current to the solenoid 32, the core 30 of which moves under the magnetic effect, thus artificially increasing the reaction in the chamber 40. The slide 22 is then displaced to the left in the Figure, until it closes the conduit 46 and opens the conduit 44, thereby bringing about a pressure reduction phase in the hydraulic motor 38. Subsequently, under the twin effect of the pressures applied to the face 24 and prevailing in the chamber 40 and the push force applied by means of the solenoid 32, the slide 22 enters the pressure-regulating phase by successively opening and closing the conduits 44 and-/or 46, until the imminent locking of the wheel is eliminated.

In the event of a failure of the source of fluid under pressure, the slide 22 acts as a master cylinder, the volume of fluid trapped in the reaction chamber 40 then being compressed under the action of the master cylinder.

In FIG. 2, the same references have been used to denote the same components. The modifications made are as follows:

The source of fluid under pressure 48 communicates with the master cylinder 10 by means of a ball valve 50 of the non-return type, normally closed and opening when the pressure of the fluid coming from the source 48 is below that of the fluid coming from the master cylinder 10. Moreover, a branch 52 equipped with a restriction allows the source of fluid under pressure 48, when it consists of a simple pump, to deliver the unused fluid under pressure towards the reservoir 14 and thus avoid undue fatigue of the pump.

This embodiment is intended to mitigate the fact that the pressure source 48, when it is a simple pump, is effective only after a particular time, albeit short, but not negligible from the point of view of safety. Thus, during braking, the fluid coming from the master cylinder 10 is applied to the hydraulic motor 38 via the valve 50 and the conduit 46 then communicating with the groove 36 as long as the pressure of the fluid delivered by the pump has not reached a sufficient threshold.

Furthermore, this solution affords another advantage in the event of a failure of the pump, because the master cylinder 10 then performs its function in full.

Although only the preferred embodiments have been illustrated and described, it is clear that an average person skilled in the art can make many modifications, without departing from the scope of the invention.

I claim:

1. Integrated pressure amplification and modulation system for a hydraulic brake circuit, comprising at least one master cylinder, a hydraulic motor, a source of fluid under high pressure and a reservoir of fluid under low pressure, a computer-controlled solenoid modulating by means of a magnetic core the position of a slide which slides in a bore, thereafter characterized in that fluid under pressure coming from the master cylinder is applied to one face of said slide the other face of which bears on said magnetic core and receives force exerted by a spring for return to rest, in that a reaction chamber formed in said slide is connected permanently to said hydraulic motor, and in that said hydraulic motor is connected to one of said reservoir and said source of fluid under pressure, depending on the position of said slide.

2. System according to claim 1, characterized in that said reaction chamber consists of an internal bore of said slide, in which a needle fixed relative to the bore is arranged sealingly.

3. System according to claim 2, characterized in that normally closed communication is formed between said source of fluid under pressure and said one face to which the pressure of the fluid coming from the master cylinder is applied, valve means opening the communication when the pressure of the fluid coming from said source under pressure is below that of the fluid coming from said master cylinder.

* * * * *